(12) United States Patent
Chang et al.

(10) Patent No.: US 10,754,236 B2
(45) Date of Patent: Aug. 25, 2020

(54) ILLUMINATION SYSTEM WITH HIGH INTENSITY PROJECTION MECHANISM AND METHOD OF OPERATION THEREOF

(71) Applicant: Optonomous Technologies Inc., Agoura Hills, CA (US)

(72) Inventors: Yung Peng Chang, Hsinchu (TW); Alan Wang, Taichung (TW); Kirk Huang, Taichung (TW); Mark Chang, Taichung (TW); Lion Wang, Hsinchu (TW); Andy Chen, Taichung (TW); Kenneth Li, Agoura Hills, CA (US)

(73) Assignee: Optonomous Technologies, Inc., Agoura Hills, CA (US)

( * ) Notice: Subject to any disclaimer, the term of this patent is extended or adjusted under 35 U.S.C. 154(b) by 0 days.

(21) Appl. No.: 16/509,196

(22) Filed: Jul. 11, 2019

(65) Prior Publication Data

US 2020/0026170 A1 Jan. 23, 2020

Related U.S. Application Data

(60) Provisional application No. 62/764,087, filed on Jul. 18, 2018.

(51) Int. Cl.
*G03B 21/20* (2006.01)
*G03B 21/00* (2006.01)
*G03B 21/16* (2006.01)

(52) U.S. Cl.
CPC ......... *G03B 21/204* (2013.01); *G03B 21/008* (2013.01); *G03B 21/16* (2013.01); *G03B 21/208* (2013.01); *G03B 21/2066* (2013.01)

(58) Field of Classification Search
CPC .. G03B 21/204; G03B 21/208; G03B 21/008; G03B 21/16
See application file for complete search history.

(56) References Cited

U.S. PATENT DOCUMENTS

| | | |
|---|---|---|
| 8,317,331 B2 | 11/2012 | Li |
| 8,562,141 B2 | 10/2013 | Ogino |
| 8,894,241 B2 | 11/2014 | Kitano |
| 9,170,475 B2 | 10/2015 | Maes et al. |
| 10,066,809 B2 | 9/2018 | Takahira et al. |
| 10,104,352 B2 | 10/2018 | Kato |
| 2013/0088471 A1 | 4/2013 | Kitano |
| 2013/0182452 A1 | 7/2013 | Takahira et al. |
| 2019/0204528 A1 | 7/2019 | Oshima et al. |
| 2019/0206851 A1 | 7/2019 | Takeya et al. |

OTHER PUBLICATIONS

"PCT Search Report/Written Opinion for parent PCT/US2019/041389 application, dated Oct. 7, 2019, 15 pages."

*Primary Examiner* — Joseph L Williams
(74) *Attorney, Agent, or Firm* — Charles A. Lemaire; Jonathan M. Rixen; Lemaire Patent Law Firm, P.L.L.C.

(57) ABSTRACT

An illumination system includes an input device configured to generate a first luminescent light beam; a pumping assembly, optically coupled to the input device, configured to project a pumping light beam into the input device; a focusing lens, aligned with the first luminescent light beam, to focus the first luminescent light beam enhanced by the pumping light beam as an output beam; and an output device, optically coupled to the focusing lens, configured to: receive the output beam from the focusing lens, and project an application output, formed with the output beam, from a projection device.

27 Claims, 6 Drawing Sheets

ILLUMINATION SYSTEM WITH HIGH INTENSITY PROJECTION MECHANISM AND METHOD OF OPERATION THEREOF

CROSS-REFERENCE TO RELATED APPLICATION

This application claims the benefit of U.S. Provisional Patent Application Ser. No. 62/764,087 filed Jul. 18, 2018, and the subject matter thereof is incorporated herein by reference thereto.

TECHNICAL FIELD

An embodiment of the present invention relates generally to an illumination system, and more particularly to a high intensity light projection system.

BACKGROUND

Projection systems include digital projectors, spotlights, "goes between optics" (GOBO) projectors, and other systems having light beams with various divergences and intensities. Traditional systems use various lamps such as incandescent, halogen, metal halide, xenon, etc. lamps selected for certain required performance. A common issue among the various light sources is the trade-off between output brightness and lamp lifetime. LEDs with long lifetimes have been used in many applications, but with less than desirable brightness. The problem of delivering high intensity light from a system that also provides long life of usage has yet to be solved.

Thus, a need still remains for an illumination system with high intensity projection mechanism to provide improved light generation, reliability, and flexibility. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

SUMMARY

An embodiment of the present invention provides an apparatus, and an illumination system, including: an input device configured to generate a first luminescent light beam; a pumping assembly, optically coupled to the input device, configured to project a pumping light beam into the input device; a focusing lens, aligned with the first luminescent light beam, to focus the first luminescent light beam enhanced by the pumping light beam as an output beam; and an output device, optically coupled to the focusing lens, configured to: receive the output beam from the focusing lens, and project an application output, formed with the output beam, from a projection device.

An embodiment of the present invention provides a method that includes generating a luminescent light beam by an input device; projecting a pumping light beam into the input device; focusing the first luminescent light beam enhanced by the pumping light beam as an output beam; receiving the output beam by an output device; and projecting an application output, formed with the output beam, from a projection device.

Certain embodiments of the invention have other steps or elements in addition to or in place of those mentioned above. The steps or elements will become apparent to those skilled in the art from a reading of the following detailed description when taken with reference to the accompanying drawings.

DETAILED DESCRIPTION

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation.

The term "adjacent" referred to herein can be defined as two elements in close proximity to each other. The terms "on" and "abut" referred to herein can be defined as two elements in physical contact with no intervening elements. The term "pump", "pumped", or "pumping" referred to herein can be defined as adding energy to a first light source from a secondary light source to increase the brightness of the first light source.

Figure 1:
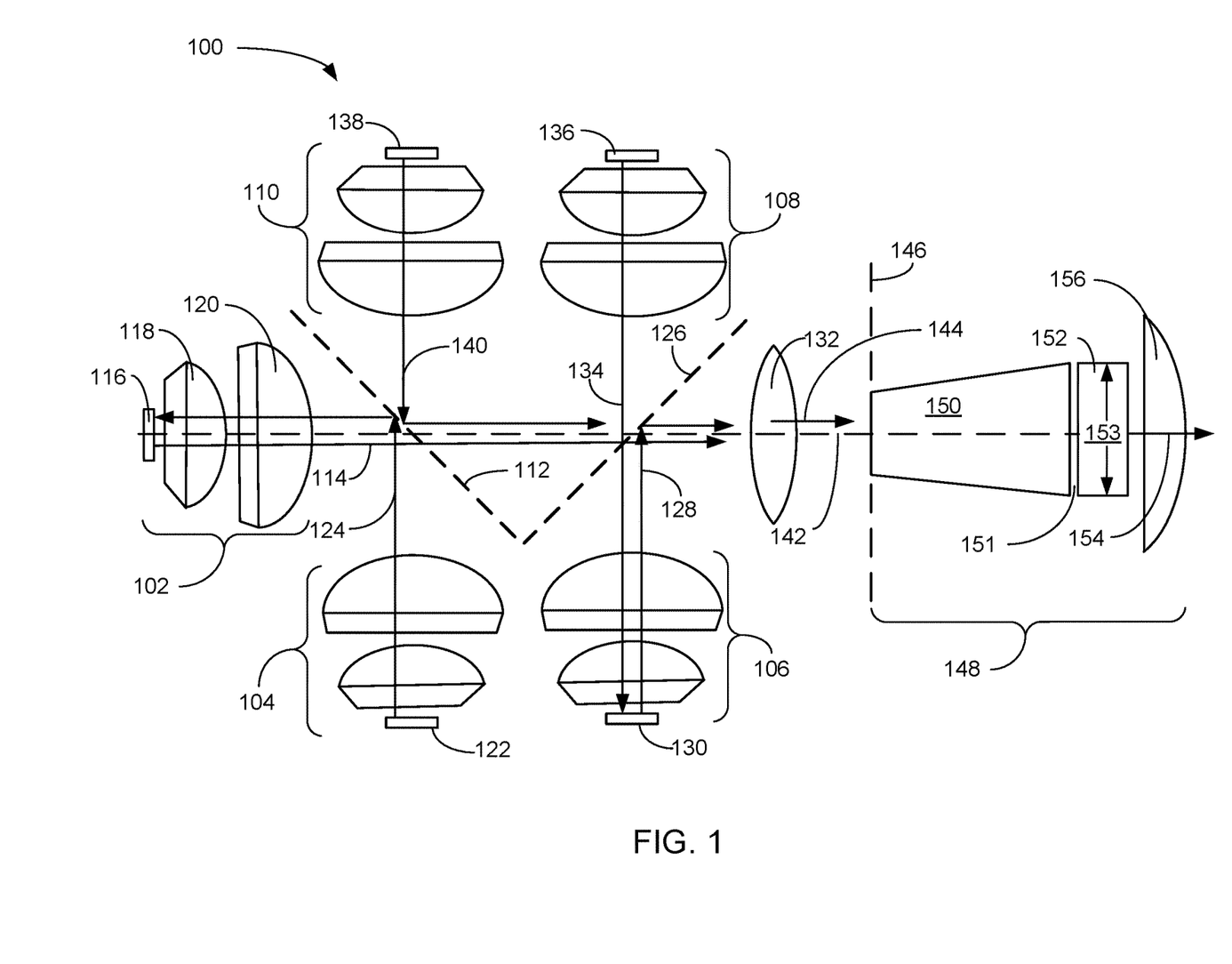
FIG. 1 is an example of a functional block diagram of an illumination system with high intensity output mechanism in an embodiment of the present invention.

Referring now to FIG. 1, therein is shown an example of a functional block diagram of an illumination system 100 with high intensity projection mechanism in one embodiment of the present invention. The illumination system 100 is depicted as a first input device 102, such as a red light assembly, enhanced by a first pumping assembly 104 that can be optically coupled to the first input device 102. A second input device 106, such as a green light assembly, enhanced by a second pumping assembly 108 that can be optically coupled to the second input device 106. A third input device 110, such as a blue light assembly, can be optically coupled to a blue reflecting filter 112.

The first input device 102 can be a hardware structure configured to source a first luminescent light beam 114, such as a red luminescent light beam. The first input device 102 includes a first light source 116, such as a laser red phosphor light source or red phosphor light emitting diode (LED) light source, that can be optically coupled to a coupling lens 118 that feeds a collimating lens 120. The first pumping assembly 104 can include a first pumping light source 122, such as a blue laser light source or a blue light emitting diode (LED). The first pumping light source 122, that can be optically coupled to an additional set of the coupling lens 118 that feeds the collimating lens 120. A first pumping light beam 124 can be projected into the blue reflecting filter 112 in order to be reflected into the first input device 102. The first pumping light beam 124 can pass through the collimating lens 120 and the coupling lens 118 in order to pump the first light source 116. The addition of the energy from the first pumping light beam 124 can increase the intensity of the first luminescent light beam 114.

The blue reflecting filter 112 can include a glass plate, plastic or film coated with a dichroic film to reflect the blue color of the first pumping light beam 124 and the third input device 110, such as a blue light assembly while, allowing the first luminescent light beam 114, such as the red luminescent light beam, to pass unaffected. A green reflective filter 126 can be positioned adjacent and perpendicular to the blue reflecting filter 112. The green reflective filter 126 can include a glass plate, plastic or film coated with a dichroic film to reflect the green color of a second luminescent light beam 128 sourced from the second input device 106.

The second input device 106 can include a second light source 130, such as a green light source, that can be optically coupled to another set of the coupling lens 118 that feeds the collimating lens 120. The second light source 130 can be a laser green phosphor light source or a green phosphor light emitting diode (LED) for producing the second luminescent light beam 128. The second luminescent light beam 128 can reflect from the green reflective filter 126 in order to change direction toward a focusing lens 132. The focusing lens 132 can be formed of glass, plastic, quartz, polysilicon glass, or the like for converging the incident light from the first input device 102, the second input device 106, and the third input device 110. The second light source 130 can receive a second pumping light beam 134 from a second pumping light source 136. The second pumping light source 136 can be optically coupled to another set of the coupling lens 118 that feeds the collimating lens 120. The second pumping light beam 134 can be a light beam that can pass through the green reflective filter 126 with no affect. The second pumping light beam 134 can enter the second input device 106 and illuminate the second light source 130 in order to increase the brightness of the second luminescent light beam 128.

The second pumping light source 136 can be a blue laser light source or a blue phosphor LED capable of producing the second pumping light beam 134 for pumping the second light source 130. The third input device 110 can include the third light source 116, such as a laser blue phosphor light source or blue phosphor light emitting diode (LED) light source, that can be optically coupled to another set of the coupling lens 118 that feeds the collimating lens 120. To produce a third luminescent light beam 140, such as a blue luminescent light beam. The third luminescent light beam 140 can be reflected by the blue reflecting filter 112 to follow an optical centerline 142. The first luminescent light beam 114, the second luminescent light beam 128, the third luminescent light beam 140, or a combination thereof can converge, along the optical centerline 142, on the focusing lens 132.

It is understood that the convergence of the first luminescent light beam 114, the second luminescent light beam 128, and the third luminescent light beam 140 on the focusing lens 132 can form an output beam 144 that is focused at an output plane 146. An output device 148 can be positioned at the output plane 146 with a size of the output beam 144 matching an input of a light pipe 150. The light pipe 150 can be a CPC, formed as a conical solid or hollow cone with a reflective coating. The light pipe 150 can be made of acrylic or polycarbonate plastic, glass, polysilicon glass, quartz, or the like. The narrow end of the conical solid shown as the light pipe 150 can match the size of the output beam 144 at the output plane 146. The larger side of the light pipe 150 can border an air gap 151 between the light pipe 150 and a "goes before optics" (GOBO) 152 for applying the output beam 144 with an even distribution The GOBO 152 can have an application size 153. The GOBO 152 can be a sheet, a wheel, a box, or a combination thereof having cutout patterns to pass a portion of the output beam 144 as an application output 154, such as a GOBO output or a patterned multi-colored display. The GOBO output 154 can be magnified by a projection device 156 for displaying the GOBO output 154 on a screen or surface (not shown). It is understood that the conical shape of the light pipe 150 can be reversed when smaller versions of the GOBO 152 are used.

It has been discovered that the illumination system 100 can provide a flexible and compact GOBO projection system for use in entertainment venues, holiday presentations, or background displays. The combination of the first luminescent light beam 114, the second luminescent light beam 128, and the third luminescent light beam 140 can be achieved with the blue reflecting filter 112, the green reflective filter 126, and the focusing lens 132. The additional pumping of the first pumping assembly 104 and the second pumping light source 136 can enhance the brightness and the distribution of the GOBO output 154.

Figure 2:
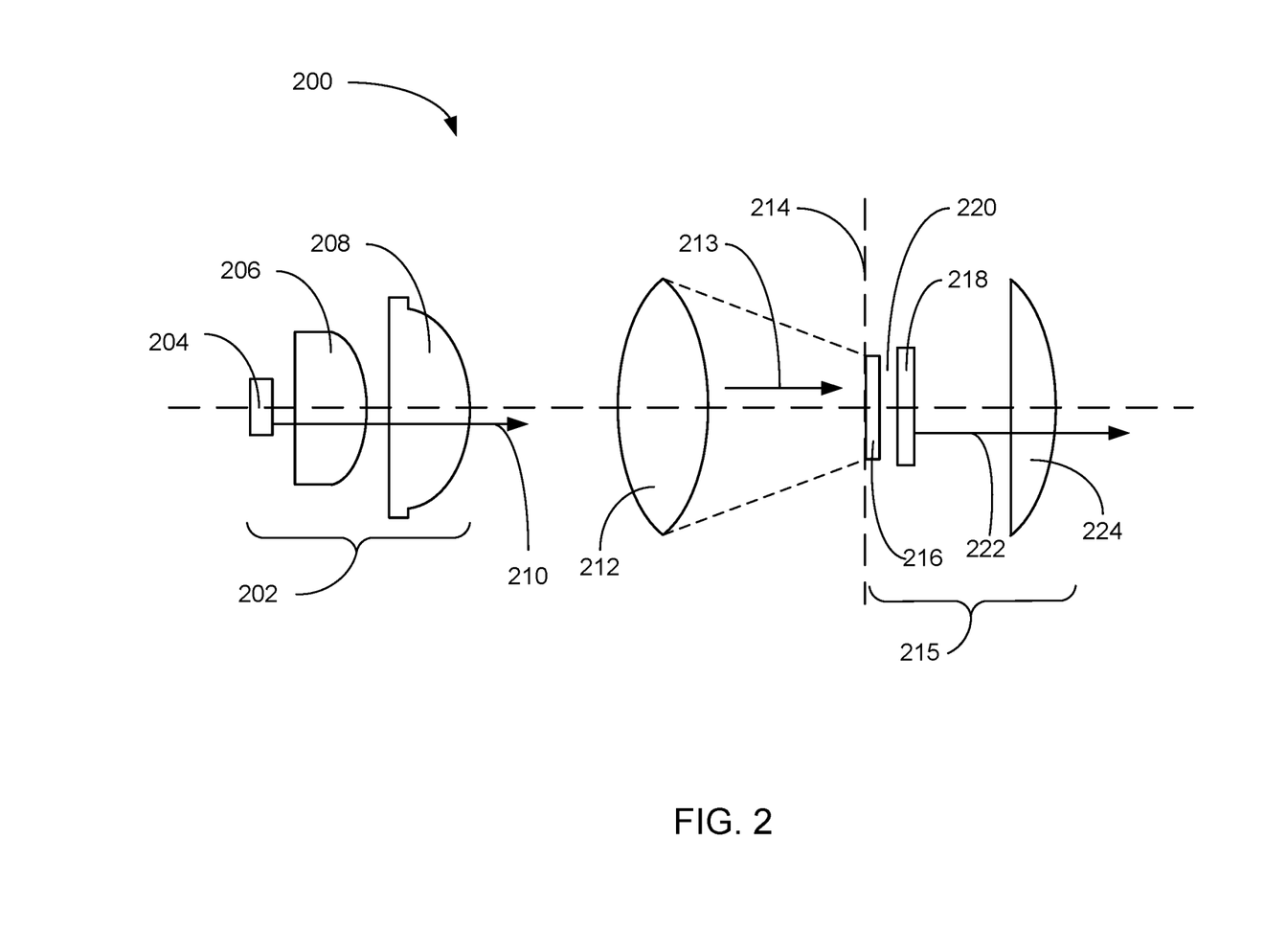
FIG. 2 is an example of a functional block diagram of an illumination system with high intensity output mechanism in an alternative embodiment.

Referring now to FIG. 2, therein is shown an example of a functional block diagram of an illumination system 200 in an alternative embodiment. The functional block diagram of the illumination system 200 depicts an input device 202 including a light source 204, such as a laser phosphor light source or phosphor light emitting diode (LED) light source. The light source 204 can be optically coupled to a coupling lens 206 and a collimating lens 208 for creating a high intensity light beam 210. The coupling lens 206 and the collimating lens 208 can be fabricated from glass, plastic, quartz, silicon glass, or the like. The coupling lens 206 can receive the output of the light source 204 and evenly distribute the output of the light source 204 for optically coupling the collimating lens 208. The collimating lens 208 can form the high intensity light beam 210 by reflecting all of the light rays from the coupling lens 206 to be parallel.

A focusing lens 212 can be formed of glass, plastic, quartz, polysilicon glass, or the like, for converging the incident light from the collimating lens 208. The focusing lens 212 can have a fixed focal length that terminates at an output plane 214. The focusing lens 212 can produce a focused light beam 213 at the output plane 214. An output device 215 can be optically coupled to the focusing lens 212. The output device 215 includes a diffuser 216 that can be formed of a sheet, plastic, glass or a combination thereof. The diffuser 216 can be in the form of a wafer, a disc, a sheet, or a rectangular solid. The diffuser 216 can evenly disburse the focused light beam 213 across its area. A "goes before optics" (GOBO) 218 can be spaced away from the diffuser 216, by a gap 220, to receive an image of the focused light beam 213 that was homogenized by the diffuser 216. The GOBO 218 can be a sheet, a wheel, a box, or a combination thereof having cutout patterns to pass a portion of the focused light beam 213 as a GOBO output 222, such as a patterned high intensity light. The GOBO output 222 can be optically coupled to a projection lens 224 for display of the GOBO output 222 on a screen or surface (not shown).

It has been discovered that the illumination system 200 can provide a single color of the GOBO output 222 in a very small space. By way of an example, the gap between the diffuser 216 and the GOBO can be in the range of eight to ten millimeters and the entire illumination system 200 can be in the range of ten centimeters to 13 centimeters.

Figure 3:
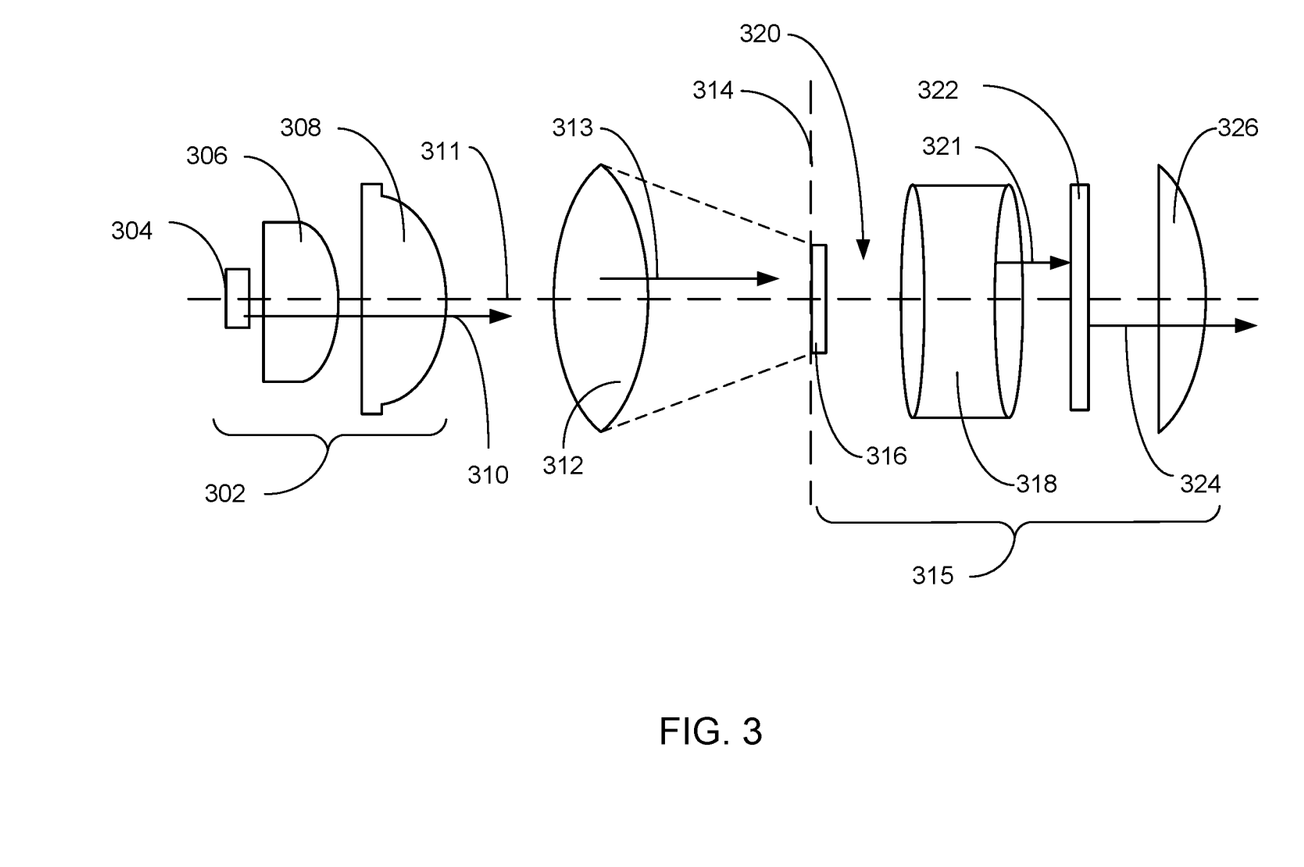
FIG. 3 is an example of a functional block diagram of an illumination system in an alternative embodiment.

Referring now to FIG. 3, therein is shown an example of a functional block diagram of an illumination system 300 in an alternative embodiment. The functional block diagram of the illumination system 300 depicts an input device 302 including a light source 304, such as a laser phosphor light source or phosphor light emitting diode (LED) light source.

The light source 304 can be optically coupled to a coupling lens 306 and a collimating lens 308 for creating a high intensity light beam 310. The coupling lens 306 and the collimating lens 308 can be fabricated from glass, plastic, quartz, silicon glass, or the like. The coupling lens 306 can receive the output of the light source 304 and evenly distribute the output of the light source 304 for optically coupling the collimating lens 308. The collimating lens 308 can form the high intensity light beam 310 by reflecting all of the light rays from the coupling lens 306 to be parallel to an optical centerline 311.

A focusing lens 312 can be formed of glass. plastic, quartz, polysilicon glass, or the like, for converging the incident light from the collimating lens 308. The focusing lens 312 can have a fixed focal length that terminates at an output plane 314. The focusing lens 312 can produce a focused light beam 313 at the output plane 314. An output device 315 can include a diffuser 316, an additional collimating lens 318, a "goes before optics" (GOBO) 322, and a projection lens 326. The diffuser 316 can be formed of a sheet, plastic, glass or a combination thereof. The diffuser 316 can be in the form of a wafer, a disc, a sheet, or a rectangular solid. The diffuser 316 can evenly disburse the focused light beam 313 across its area.

The additional collimating lens 318 can be spaced away from the diffuser 316, by a gap 320, that allows the diffuser to expand the focused light beam 313 to the size of the additional collimating lens 318. The additional collimating lens 318 can be fabricated from glass, plastic, quartz, silicon glass, or the like. The additional collimating lens 318 can homogenize the focused light beam 313 across its surface area as a homogenized light beam 321. The additional collimating lens 318 can be formed to be the same size as the "goes before optics" (GOBO) 322. The GOBO 322 can be a sheet, a wheel, a box, or a combination thereof having cutout patterns to pass a portion of the homogenized light beam 321 as a GOBO output 324, such as a patterned high intensity light. The GOBO output 324 can be optically coupled to the projection lens 326 for display of the GOBO output 324 on a screen or surface (not shown).

It has been discovered that by placing the additional collimating lens 318 at a distance from the diffuser 316, the illumination system 300 can support larger apertures for the GOBO 322 without losing intensity of the GOBO output 324 at the edges. The even distribution of the homogenized light beam 321 can use the light source 304, where prior systems would need multiple light sources and still have difficulty providing even lighting through the GOBO 322.

Figure 4:
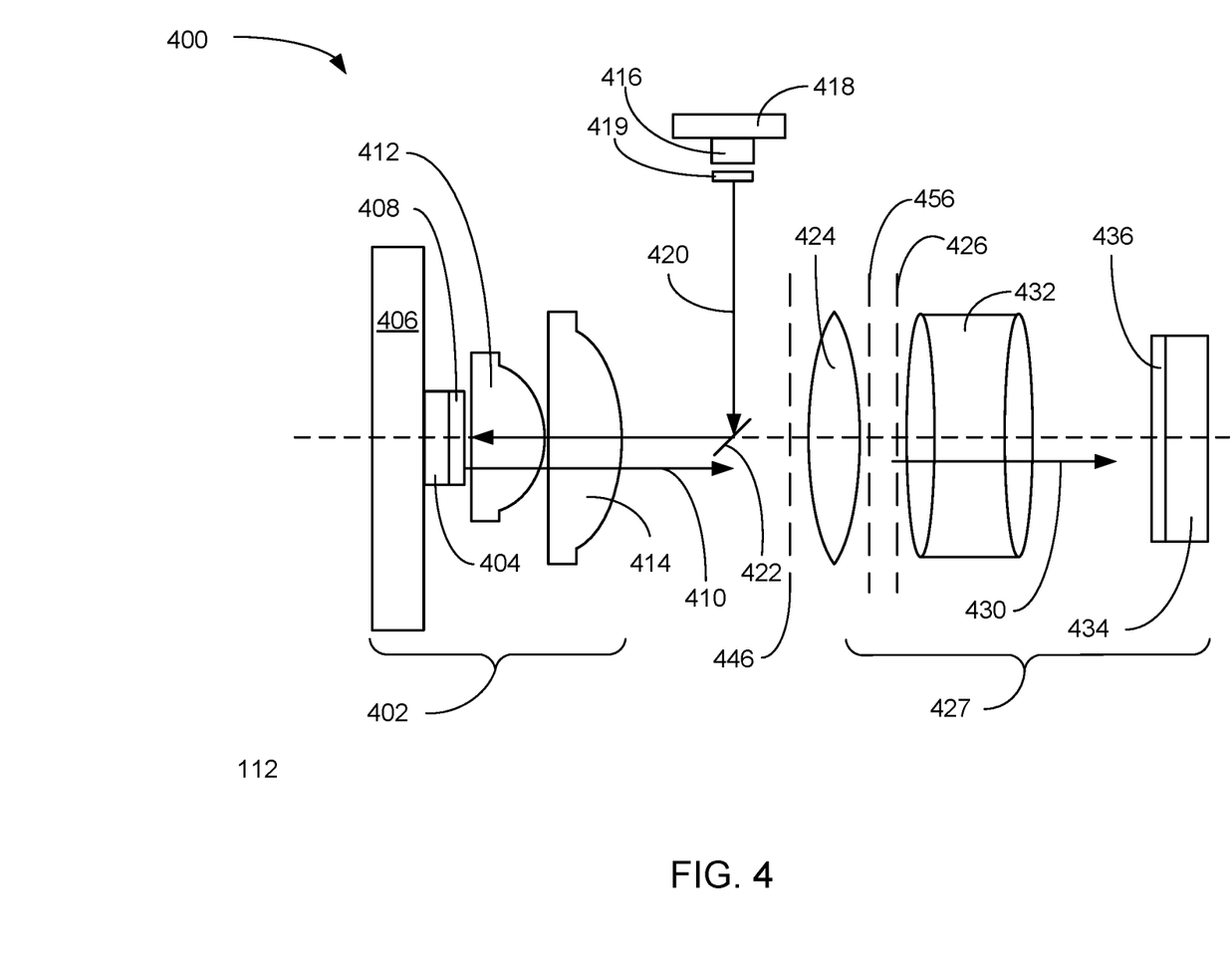
FIG. 4 is an example of a functional block diagram of an illumination system in an alternative embodiment.

Referring now to FIG. 4, therein is shown an example of a functional block diagram of an illumination system 400 in an alternative embodiment. The functional block diagram of the illumination system 400 depicts an input device 402 including a source light emitting diode (LED) 404 mounted on a light source heat sink 406. A phosphor layer 408 can be formed on or over the source LED 404. The phosphor layer 408 can be a single-crystalline structure or a phosphor impregnated structure, such as glass, ceramic, plastic, or the like, formed of a reactive material for producing a white light when activated. The phosphor layer 408 can be either directly deposited on the source LED 404 or mounted as a glass, ceramic, or crystal phosphor plate placed over the source LED 404 with a small distance (not shown) between the source LED 404 and the phosphor layer 408. A luminescent light beam 410 can emanate from the phosphor layer 408 when it is activated by the source LED 404.

The luminescent light beam 410 can pass through a coupling lens 412 and a collimating lens 414 to evenly distribute the pattern of light from the phosphor layer 408. A laser source 416 can be mounted on a laser heat sink 418. A laser collimating lens 419 can be positioned on or adjacent to the laser source 416. The laser collimating lens 419 can be formed of glass, plastic, quartz, polysilicon glass, or the like. The laser source 416 can be a single laser diode or an array of the laser diodes for generating a laser pumping light beam 420 when the laser source 416 is activated. The laser pumping light beam 420 can be a blue laser light that can be reflected from a blue reflecting filter 422. The blue reflecting filter 422 can include a glass plate, plastic or film coated with a dichroic film to reflect the blue color of the laser pumping light beam 420 but pass other colors of light. The blue reflecting filter 422 can reflect the laser pumping light beam 420 onto the surface of the phosphor layer 408 in order to generate additional intensity in the luminescent light beam 410.

The luminescent light beam 410 can be projected into a focusing lens 424. The focusing lens 424 can be formed of glass, plastic, quartz, polysilicon glass, or the like, for converging the luminescent light beam 410 from the collimating lens 414. In one embodiment, the output can terminate at the output plane 446 as an output parallel beam. In another embodiment, the focusing lens 424 can have a fixed focal length, taking the parallel beam from the collimating lens 414, terminates at the output plane 456 as an output converging beam and focuses the beam onto the focal plane 426 at a distance from the focusing lens 424 outside the system output plane 456. An output device 427 can include an additional collimating lens 432, and a digital micromirror device (DMD) 434. The projected light beam 430 can pass through the additional collimating lens 432. The additional collimating lens 432 can be fabricated from glass, plastic, quartz, silicon glass, or the like, for projecting the projected light beam 430 onto the digital micromirror device (DMD) 434 for displaying an image 436 of the projected light beam 430.

It has been discovered that the illumination system 400 can provide a multi-stage illumination system by selectively activating the laser source 416 for generating the laser pumping light 420. It is understood that the laser pumping light beam 420 is a narrow beam of laser light, but could be expanded by using a larger one of the blue reflecting filter 422 or by providing a larger geometry for the laser source 416. By using the small geometry for the laser source 416 and the blue reflecting filter 422, a hot spot (not shown) can be created in the central portion of the luminescent light beam 410 having additional brightness only where the laser pumping light beam 420 is reflected onto the phosphor layer 408. This can be useful in certain applications or for display functions where a central item is highlighted by the additional brightness of the hot spot while the surrounding items are less brightly lit such as, for example, in applications to spot lights, dynamic displays, search lights, or vehicle lighting systems (which may or may not use DMDs).

Figure 5:
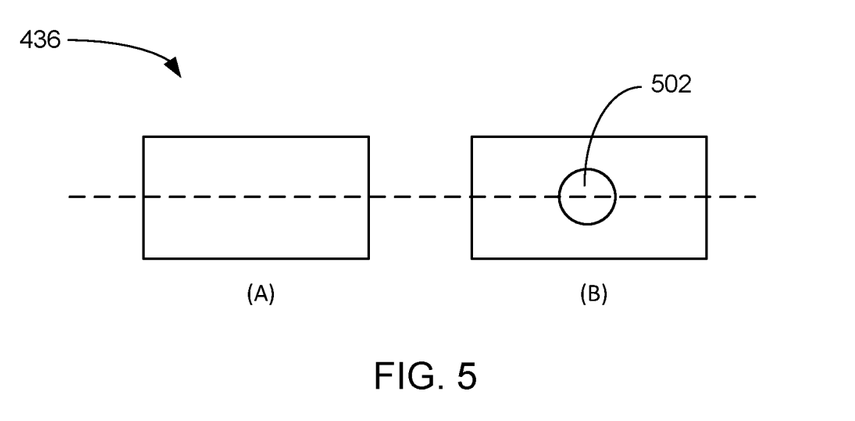
FIG. 5 is an example of the image of the projected light beam as seen on the digital micromirror device (DMD) of FIG. 4.

Referring now to FIG. 5, therein is shown an example of the image 436 of the projected light beam 430 as seen on the digital micromirror device (DMD) 434 of FIG. 4. The example of the image 436 depicts view of the digital micromirror device (DMD) showing the image of the incident projected light beam 430.

The left side image (A) shows the image 436 without the laser source 416 of FIG. 4 being activated. The illumination density is dispersed evenly across the entire surface of the DMD 434. When the laser source 416 is activated as a narrow beam of the laser pumping light beam 420 of FIG. 4, a hot spot 502 can be seen aligned on the centerline of the DMD 434. The hot spot 502 can be an area of increased intensity that is displayed as a brighter spot in the DMD 434. It is understood that the size and position of the hot spot 502 can be controlled by changing the position or size of the blue reflecting filter 422 and the size of the laser beam 420 of FIG. 4 to control how wide the laser pumping light beam 420 is when it contacts the DMD 434. This can be useful in entertainment spot lights, dynamic displays, search lights, or vehicle lighting systems.

Figure 6:
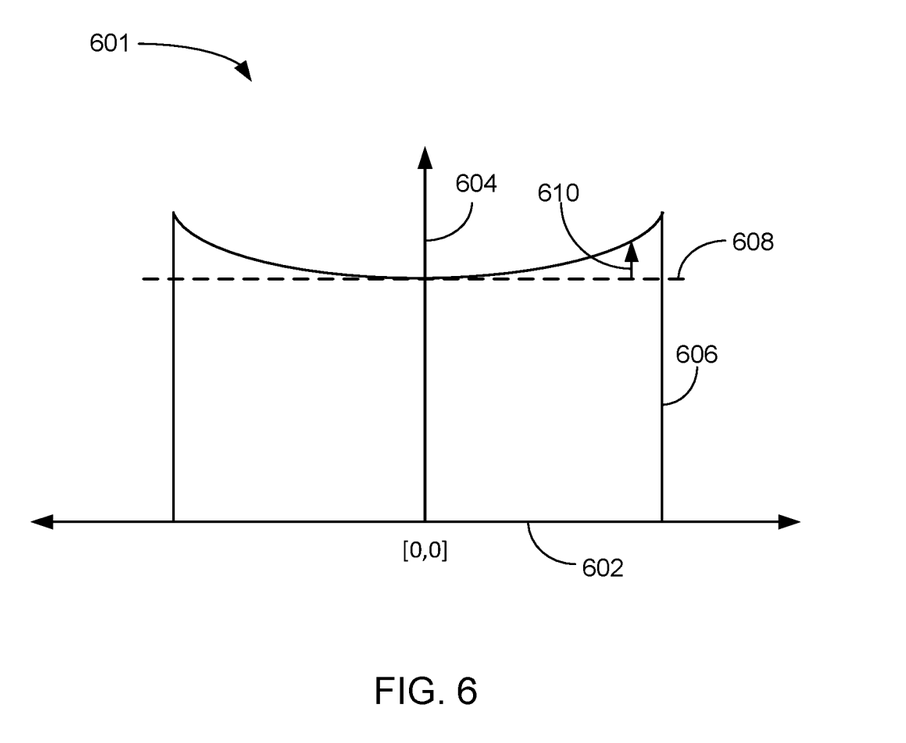
FIG. 6 is an example of an intensity distribution of the output beam of FIG. 1.

Referring now to FIG. 6, therein is shown is an example of an intensity distribution profile 601 of the output beam 154 of FIG. 1. The intensity distribution profile 601 can have an output angle 602 showing a presentation angle from an optical centerline 604 of the illumination system 100 of FIG. 1. The output angle 602 can increase either side of the optical centerline 604. The optical centerline 604 indicated by [0,0] shows a strong intensity with a slow increase as the angle from the optical centerline 604 increases to a maximum angle 606. By way of an example, a centerline intensity 608 can mark the bright center of the output angle 602. As the output angle 602 increases, an additional intensity 610 gets larger. This is compared to prior illumination systems (not shown) that provide their maximum intensity at the optical centerline 604 and provides a diminishing intensity as the output angle 602 increases. The intensity distribution profile 601 can be the results of diffusers 216 in FIGS. 2 and 316 in FIG. 3. With such diffusers with higher output at higher angles, the resulting projected intensity at the screen with the projected image (not shown) will not have corners and edges with lower intensity as the extra intensity at the larger angle will compensate the longer projection distances of the corners and edges from the projection lens. The spacing of the light pipe 150 from the focusing lens 132 and the GOBO 152 can be adjusted to produce an optimal intensity of the hot spot 502 and intensity distribution profile 601 for the specific applications noted. Prior art illumination systems would not be able to maintain the illumination intensity across the full screen.

Figure 7:
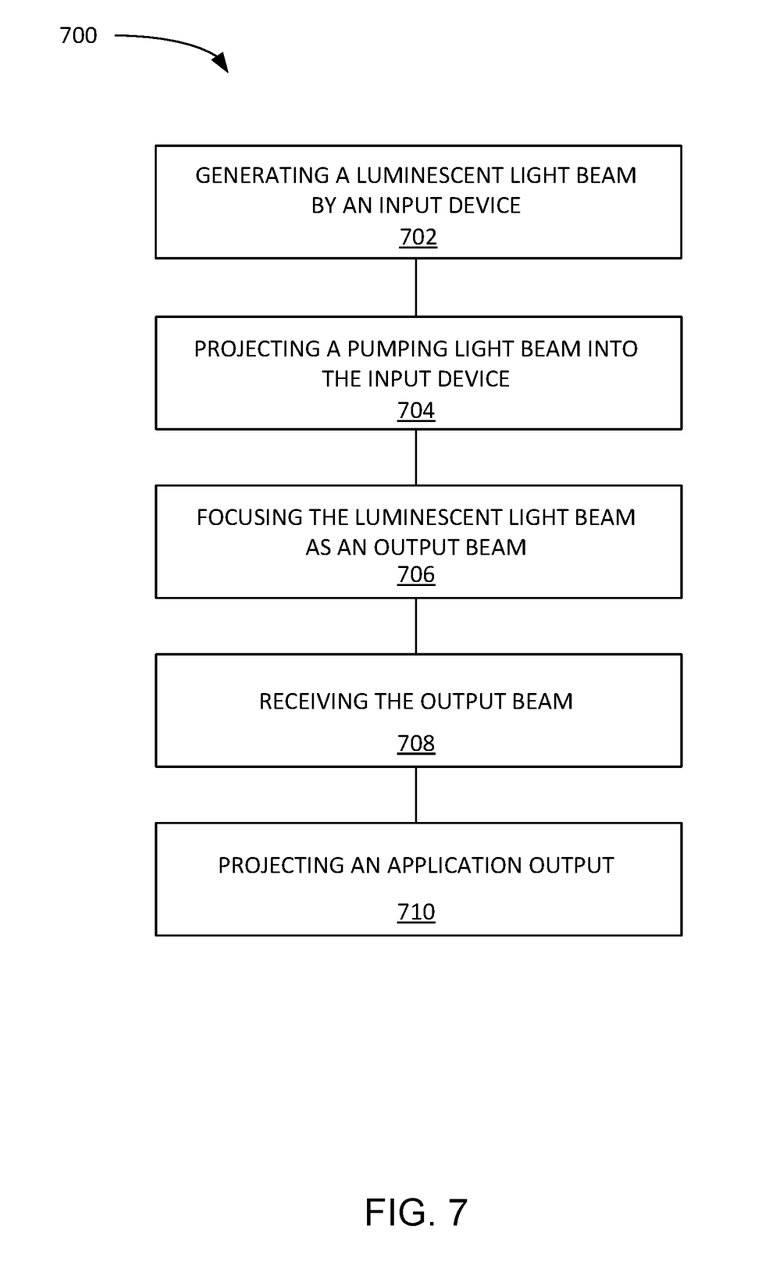
FIG. 7 is a flow chart of a method of operation of an illumination system in an embodiment of the present invention.

Referring now to FIG. 7, therein is shown a flow chart of a method 700 of operation of an illumination system 100 in an embodiment of the present invention. The method 700 includes: generating a luminescent light beam by an input device in a block 702; projecting a pumping light beam into the input device in a block 704; focusing the luminescent light beam enhanced by the pumping light beam as an output beam in a block 706; receiving the output beam by an output device in a block 708; and projecting an application output, formed with the output beam, from a projection device in a block 710.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. An illumination system comprising:
   an input device, wherein the input device includes:
      a phosphor layer having a first input face and a second input face, and
      a first activation-light source optically coupled to direct activation light into the first input face of the phosphor layer to generate a first luminescent light beam;
   a first pumping assembly, optically coupled to the input device, configured to generate a pumping light beam;
   a first wavelength-selective reflector filter, wherein the first wavelength-selective reflector filter is configured to optically couple the pumping light beam into the second input face of the phosphor layer of the input device, and wherein the first wavelength-selective reflector filter is configured to output the first luminescent light beam;
   a focusing lens, aligned with the first luminescent light beam, to focus the first luminescent light beam enhanced by the pumping light beam as an output beam; and
   an output device, optically coupled to the focusing lens, configured to:
      receive the output beam from the focusing lens, and
      project an application output, formed with the output beam, from a projection device.

2. The system as claimed in claim 1, further comprising:
   a second input device, optically coupled to the focusing lens, configured to generate a second luminescent light beam;
   a second wavelength-selective reflector filter in an optical path between the second input device and the focusing lens, configured to reflect the second luminescent light beam into the output device; and
   a second pumping assembly, optically coupled to the second input device, configured to project a second pumping light beam through the second wavelength-selective reflector filter and into the second input device.

3. The system as claimed in claim 1, wherein:
the output device is further configured to diffuse the output beam including a light pipe configured to receive the output beam and diffuse the output beam to match an application size.

4. The system as claimed in claim 1 further comprising:
a third input device, optically coupled to the focusing lens, configured to generate a third luminescent light beam; and
a third wavelength-selective reflector filter in an optical path between the third input device and the focusing lens, configured to reflect the third luminescent light beam to be parallel with and in the same direction as the first luminescent light beam.

5. The system as claimed in claim 1 wherein the output device includes:
an additional collimating lens configured to evenly distribute the projected light beam; and
a digital micromirror device (DMD) configured to display an image of the projected light beam.

6. The system as claimed in claim 1, the first pumping assembly further comprising:
a laser source optically coupled to the input device;
a collimating lens, adjacent to the laser source, configured to form a laser pumping light beam; and
wherein the first wavelength-selective filter is optically between the laser source and the input device, and is configured to reflect the laser pumping light beam into the input device to create a hot spot.

7. The system as claimed in claim 1 wherein the first activation-light source includes:
a laser optically coupled to the first input face of the phosphor layer, and wherein the input device further includes:
a coupling lens, aligned with the first light source, configured to diffuse the first luminescent light beam; and
a collimating lens, aligned with the diffuser lens, configured to project the first luminescent light beam to the focusing lens.

8. The system as claimed in claim 1,
wherein the first activation light source includes:
a source light emitting diode (LED), mounted on a light source heat sink, configured to cool the source LED, and wherein the phosphor layer is adjacent to the source LED and is configured to produce the first luminescent light beam when the source LED activates the phosphor layer, wherein the first pumping assembly is configured to generate a laser pumping light beam; and
a collimating lens configured to transfer the laser pumping light beam to the phosphor layer and project the first luminescent light beam from the phosphor layer including a hot spot when activated by the laser pumping light beam.

9. The system as claimed in claim 1 wherein the output device includes a diffuser configured to provide a centerline intensity and an additional intensity that increases with an increase in an output angle.

10. An illumination system comprising:
an input device configured to generate a first luminescent light beam;
a pumping assembly, optically coupled to the input device, configured to project a pumping light beam into the input device;
a focusing lens, aligned with the first luminescent light beam, to focus the first luminescent light beam enhanced by the pumping light beam as an output beam; and
an output device, optically coupled to the focusing lens, configured to:
receive the output beam from the focusing lens, and
project an application output, formed with the output beam, from a projection device, wherein:
the input device includes a light source, optically coupled to a diffuser lens and a collimating lens, configured to generate a high intensity light beam; and
the output device includes:
a diffuser configured to receive the high intensity light beam,
a "goes before optics" (GOBO), spaced away from the diffuser by a gap, configured to generate a GOBO output from the high intensity light beam; and
a projection lens, aligned with the GOBO, configured to project the GOBO output.

11. An illumination system comprising:
an input device configured to generate a first luminescent light beam;
a pumping assembly, optically coupled to the input device, configured to project a pumping light beam into the input device;
a focusing lens, aligned with the first luminescent light beam, to focus the first luminescent light beam enhanced by the pumping light beam as an output beam; and
an output device, optically coupled to the focusing lens, configured to:
receive the output beam from the focusing lens, and
project an application output, formed with the output beam, from a projection device, wherein the output device includes:
a diffuser configured to receive a focused light beam from the focus lens;
an additional collimating lens configured to generate a homogenized light beam from the focused light beam;
a "goes before optics" (GOBO), spaced away from the additional collimating lens, configured to generate a GOBO output from the homogenized light beam; and
a projection lens, optically coupled to the GOBO, configured to project the GOBO output.

12. A method for operating an illumination system comprising:
generating a first luminescent light beam by an input device, wherein the input device includes:
a phosphor layer having a first input face and a second input face, and
a first activation-light source optically coupled to direct activation light into the first input face of the phosphor layer to generate the first luminescent light beam;
projecting a pumping light beam into the second input face of the phosphor layer of the input device via a first wavelength-selective filter and outputting the first luminescent light beam via the first wavelength-selective filter;
focusing the first luminescent light beam enhanced by the pumping light beam as an output beam;
receiving the output beam by an output device; and
projecting an application output, formed with the output beam, from a projection device.

13. The method as claimed in claim 12 further comprising:

generating a second luminescent light beam;

reflecting the second luminescent light beam from a second wavelength-selective reflective filter into the output device; and projecting a second pumping light beam through the second wavelength-selective reflective filter and into the second input device.

14. The method as claimed in claim 12 wherein receiving the output beam by the output device includes diffusing the output beam to match an application size.

15. The method as claimed in claim 12 further comprising generating a third luminescent light beam and reflecting the third luminescent light beam to be parallel with and in the same direction as the first luminescent light beam.

16. The method as claimed in claim 12 further comprising:

producing a projected light beam;

evenly distributing the projected light beam; and displaying an image of the projected light beam on a digital micromirror device (DMD).

17. The method as claimed in claim 12, the projecting of the pumping light beam further comprising:

forming a laser pumping light beam by a collimating lens adjacent to a laser source; and optically coupling the laser pumping light beam into the second input face of the phosphor layer of the input device to create a hot spot.

18. The method as claimed in claim 12 further comprising:

generating the first luminescent light beam by a laser optically coupled to the phosphor layer; and projecting the first luminescent light beam to a focusing lens.

19. The method as claimed in claim 12, wherein the first activation-light source includes a source LED, the method further comprising:

mounting the source LED on a light source heat sink;

producing the first luminescent light beam by the source LED activating the phosphor layer; and projecting the first luminescent light beam from the phosphor layer including a hot spot that is generated when transferring a laser pumping light beam to the phosphor layer.

20. The method as claimed in claim 12 further comprising providing a centerline intensity and an additional intensity that increases with an increase in an output angle.

21. A method for operating an illumination system comprising:

generating a luminescent light beam by an input device;

projecting a pumping light beam into the input device;

focusing a first luminescent light beam enhanced by the pumping light beam as an output beam;

receiving the output beam by an output device;

projecting an application output, formed with the output beam, from a projection device;

generating a high intensity light beam by optically coupling a light source through a diffuser lens and a collimating lens;

receiving the high intensity light beam by a diffuser;

generating a GOBO output from the high intensity light beam; and projecting the GOBO output through a projecting lens.

22. A method for operating an illumination system comprising:

generating a luminescent light beam by an input device;

projecting a pumping light beam into the input device;

focusing a first luminescent light beam enhanced by the pumping light beam as an output beam;

receiving the output beam by an output device;

projecting an application output, formed with the output beam, from a projection device;

receiving a focused light beam from a focus lens;

generating a homogenized light beam from the focused light beam;

generating a GOBO output from the homogenized light beam; and project the GOBO output through a projection lens.

23. An illumination system comprising:

a phosphor layer having a first input face and a second input face, and configured to generate a first luminescent light beam;

a first activation-light source optically coupled to direct activation light into the first input face of the phosphor layer;

a first pumping source that generates a pumping laser beam; and a wavelength-selective reflector, wherein the wavelength-selective reflector is configured to optically couple the pumping laser beam to the second input face of the phosphor layer, and wherein the wavelength-selective reflector is configured to output the first luminescent light beam.

24. The system of claim 23, further comprising:

a focusing lens, aligned to receive the first luminescent light beam and to focus the first luminescent light beam enhanced by the pumping laser beam as an intermediate output beam; and a projection device, optically coupled to:
  receive the intermediate output beam from the focusing lens, and
  project an application output beam.

25. The system of claim 23, wherein the phosphor layer is a glass, ceramic, or crystal phosphor plate.

26. The system of claim 23, wherein the phosphor layer is formed on the first activation-light source.

27. The system of claim 23, wherein the activation-light source is a light-emitting diode (LED).

* * * * *